(12) United States Patent
Gao

(10) Patent No.: US 9,986,362 B2
(45) Date of Patent: May 29, 2018

(54) INFORMATION PROCESSING METHOD AND ELECTRONIC DEVICE

(71) Applicant: Lenovo (Beijing) Limited, Beijing (CN)

(72) Inventor: Lixin Gao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 17 days.

(21) Appl. No.: 14/980,989

(22) Filed: Dec. 28, 2015

(65) Prior Publication Data
US 2017/0094439 A1    Mar. 30, 2017

(30) Foreign Application Priority Data

Sep. 24, 2015  (CN) .......................... 2015 1 0618443

(51) Int. Cl.
*H04S 7/00*       (2006.01)
*G06F 3/01*       (2006.01)
(Continued)

(52) U.S. Cl.
CPC .............. *H04S 7/303* (2013.01); *G06F 3/012* (2013.01); *G06F 3/165* (2013.01); *G06K 9/00335* (2013.01); *H04S 3/008* (2013.01)

(58) Field of Classification Search
None
See application file for complete search history.

(56) References Cited

U.S. PATENT DOCUMENTS

| 6,845,338 B1* | 1/2005 | Willins .................. G01S 3/803 |
| | | 340/988 |
| 2012/0114132 A1* | 5/2012 | Abrahamsson ...... H04R 1/1016 |
| | | 381/74 |

(Continued)

FOREIGN PATENT DOCUMENTS

| CN | 10256853 A | 7/2012 |
| CN | 104581602 A | 4/2015 |
| WO | WO-2013064914 A1 | 5/2013 |

OTHER PUBLICATIONS

"German Application Serial No. 10 2016 101 316.1, Office Action dated Apr. 6, 2016", w/ English Translation, (dated Apr. 6, 2016), 13 pgs.

(Continued)

*Primary Examiner* — Paul Huber
(74) *Attorney, Agent, or Firm* — Schwegman Lundberg & Woessner, P.A.

(57) ABSTRACT

The present disclosure provides an information processing method and an electronic device. The method comprises: obtaining an audio signal in an output signal; determining N channel signals in the audio signal, where N is a positive integer; determining whether the audio signal needs to be adjusted or not; and adjusting, when the audio signal needs to be adjusted, an output parameter of at least one of the N channel signals respectively, and outputting the N adjusted channel signals via an audio output device, such that the N adjusted channel signals correspond to a sound source position of the audio signal. The above method according to the present disclosure can solve the technical problem that the audio signal cannot be adjusted in real time and achieve a technical effect of automatic adjustment of the audio signal.

11 Claims, 2 Drawing Sheets

(51) Int. Cl.
  *G06F 3/16* (2006.01)
  *G06K 9/00* (2006.01)
  *H04S 3/00* (2006.01)

(56) References Cited

U.S. PATENT DOCUMENTS

| | | |
|---|---|---|
| 2012/0237053 A1 | 9/2012 | Alam et al. |
| 2013/0100236 A1 | 4/2013 | Zhan et al. |
| 2015/0193197 A1* | 7/2015 | Nahman ............. G06F 3/04842 715/716 |
| 2016/0132289 A1* | 5/2016 | Vennstrom ............. G06F 3/167 700/94 |
| 2016/0241980 A1* | 8/2016 | Najaf-Zadeh ........... H04S 7/303 |
| 2016/0363992 A1* | 12/2016 | Welti ...................... G06F 3/012 |
| 2017/0070835 A1* | 3/2017 | Silva ................... G11B 27/034 |

OTHER PUBLICATIONS

"German Application Serial No. 10 2016 101 316.1, Office Action dated Jun. 29, 2017", w/ English Translation, (dated Jun. 29, 2017), 12 pgs.

"Chinese Application No. 201510618443.1, Office Action dated Sep. 29, 2017", w/ English Translation, (Sep. 29, 2017), 19 pgs.

* cited by examiner

INFORMATION PROCESSING METHOD AND ELECTRONIC DEVICE

CROSS-REFERENCE TO RELATED APPLICATION(S)

This application claims priority to the Chinese Patent Application No. 201510618443.1, filed on Sep. 24, 2015, entitled "INFORMATION PROCESSING METHOD AND ELECTRONIC DEVICE" which is incorportated herein by reference in its entirety.

TECHNICAL FIELD

The present disclosure relates to electronics technology, and more particularly, to an information processing method and an electronic device.

BACKGROUND

With the continuous development of science and technology, functions of electronic devices become more and more powerful and users demands on experiences become increasingly higher. Conventionally, audio signals output from electronic devices are fixed, i.e., audio signals output for individual channels are predetermined. In an example of virtual reality, while a user is using the virtual reality, a virtual scene may vary as the user's head moves. However, audio signals for the scene are predetermined for outputting via an audio output device and will not change accordingly as the scene changes. Hence, the audio signals cannot be adjusted in real-time, and the user cannot have an immersive experience while using the virtual reality.

SUMMARY

In an aspect, an information processing method is provided according to an embodiment of the present disclosure. The method comprises: obtaining an audio signal in an output signal; determining N channel signals in the audio signal, where N is a positive integer; determining whether the audio signal needs to be adjusted; and adjusting, if the audio signal needs to be adjusted, an output parameter of at least one of the N channel signals respectively, and outputting the N adjusted channel signals via an audio output device, such that the N adjusted channel signals correspond to a sound source position of the audio signal.

Optionally, the method further comprises, prior to the step of determining whether the audio signal needs to be adjusted: determining a device type of the audio output device, wherein the device type corresponds to a mobile audio output device or a fixed audio output device, the mobile audio output device matching a head gesture of a user of the electronic device. Accordingly, the step of determining whether the audio signal needs to be adjusted comprises: determining whether the audio signal needs to be adjusted based on the device type.

Optionally, the step of determining whether the audio signal needs to be adjusted comprises: determining that the audio signal needs to be adjusted if the output signal is a panoramic video signal and the device type is the mobile audio output device, the panoramic video signal being output from a head-wearing device and capable of switching a video content based on a change in the head gesture of the user. Accordingly, the step of adjusting the output parameter of at least one of the N channel signals respectively comprises: adjusting the output parameter of the at least one channel signal respectively in response to switching the video content.

Optionally, the step of determining whether the audio signal needs to be adjusted comprises: determining that the audio signal needs to be adjusted if the output signal is a normal video signal and the device type is the fixed audio output device. Accordingly, the step of adjusting the output parameter of at least one of the N channel signals respectively comprises: adjusting the output parameter of the at least one channel signal respectively in response to switching of a video content of the normal video signal.

Optionally, the step of determining whether the audio signal needs to be adjusted comprises: detecting the head gesture of the user of the electronic device, the audio signal being adjustable based on the head gesture; and determining that the audio signal needs to be adjusted if a change in the head gesture is detected and the device type is the mobile audio output device. Accordingly, the step of adjusting the output parameter of at least one of the N channel signals respectively comprises: adjusting the output parameter of the at least one channel signal respectively based on the head gesture.

Optionally, the step of adjusting the output parameter of at least one of the N channel signals respectively comprises: determining M sound source signals constituting an i-th channel signal, where i is an integer ranging from 1 to N; adjusting the output parameter of each of the M sound source signals respectively based on a video content of the video signal or a detected head gesture of a user of the electronic device, so as to obtain M adjusted sound source signals; and mixing the M adjusted sound source signals into an i-th adjusted channel signal.

In another aspect, an electronic device is provided. The electronic device comprises a processor; and an audio output device coupled to the processor. The processor is configured to: obtain an audio signal in an output signal; determine N channel signals in the audio signal, where N is a positive integer; determine whether the audio signal needs to be adjusted or not; and adjust, if the audio signal needs to be adjusted, an output parameter of at least one of the N channel signals respectively. The audio output device is configured to: output the N adjusted channel signals, such that the N adjusted channel signals correspond to a sound source position of the audio signal.

Optionally, the processor is further configured to: determine a device type of the audio output device, wherein the device type corresponds to a mobile audio output device or a fixed audio output device, the mobile audio output device matching a head gesture of a user of the electronic device; and determine whether the audio signal needs to be adjusted based on the device type.

Optionally, the processor is further configured to: determine that the audio signal needs to be adjusted if the output signal is a panoramic video signal and the device type is the mobile audio output device, the panoramic video signal being output from a head-wearing device and capable of switching a video content based on a change in the head gesture of the user, and adjust the output parameter of the at least one channel signal respectively in response to switching the video content.

Optionally, the processor is further configured to: determine that the audio signal needs to be adjusted if the output signal is a normal video signal and the device type is the fixed audio output device, and adjust the output parameter of the at least one channel signal respectively in response to switching a video content of the normal video signal.

Optionally, the electronic device further comprises: a detection unit configured to detect the head gesture of the user of the electronic device, the audio signal being adjustable based on the head gesture. The processor is further configured to: determine that the audio signal needs to be adjusted if a change in the head gesture is detected and the device type is the mobile audio output device, and adjust the output parameter of the at least one channel signal respectively based on the head gesture.

Optionally, the processor is further configured to: determine M sound source signals constituting an i-th channel signal, where i is an integer ranging from 1 to N; adjust the output parameter of each of the M sound source signals based on a video content of the video signal or a detected head gesture of a user of the electronic device, so as to obtain M adjusted sound source signals; and mix the M adjusted sound source signals into an i-th adjusted channel signal.

BRIEF DESCRIPTION OF THE DRAWINGS

In order to illustrate the solutions according to the embodiments of the present disclosure or the prior art clearly, the figures used for description of the embodiments or the prior art will be introduced briefly here. It is apparent to those skilled in the art that the figures described below only illustrate some embodiments of the present disclosure and other figures can be obtained from these figures without applying any inventive skills.

DETAILED DESCRIPTION OF THE EMBODIMENTS

The embodiments of the present disclosure provide an information processing method and an electronic device, capable of solving the problem in the conventional solution that the audio signals cannot be adjusted in real-time and achieving a technical effect of automatic adjustment of the audio signals.

In order to solve the above problem, the general concept of the solutions according to the embodiments of the present disclosure is as follows.

An audio signal in an output signal is obtained. N channel signals in the audio signal are determined, where N is a positive integer. It is determined whether the audio signal needs to be adjusted or not. When the audio signal needs to be adjusted, an output parameter of at least one of the N channel signals is adjusted respectively. The N adjusted channel signals are output via an audio output device, such that the N adjusted channel signals correspond to a sound source position of the audio signal.

With the above solution, once an audio signal in an output signal has been obtained, the audio signal is processed to determine N channel signals in the audio signal. When the audio signal needs to be adjusted, an output parameter of at least one of the N channel signals is adjusted respectively, such that the N adjusted channel signals correspond to a sound source position of the audio signal. For example, when a position of the user changes with respect to the sound source position, the audio signal can be adjusted automatically according to the above method. In contrast, in the conventional solution, the parameter of the audio signal is predetermined and fixed, regardless of whether there is a positional change. In this way, the solution according to the embodiment of the present disclosure can solve the technical problem that the audio signal cannot be adjusted in real time and achieve a technical effect of automatic adjustment of the audio signal.

In the following, the solutions of the present invention will be described in detail with reference to the figures and the embodiments. It should be noted that the embodiments of the present invention and their specific features are given for illustrating the solutions of the present invention and are not intended to limit the scope of the present invention. The embodiments of the present invention and their specific features can be combined with each other, provided that they do not conflict.

First Embodiment

Figure 1:
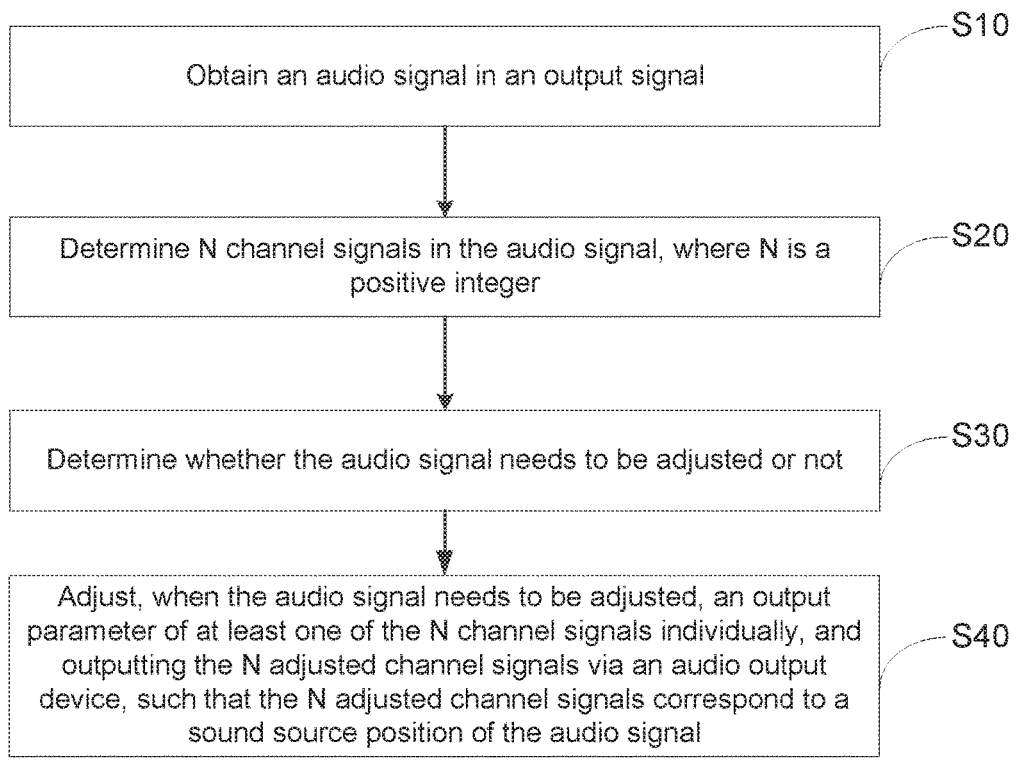
FIG. 1 is a flowchart illustrating an information processing method according to a first embodiment of the present disclosure.

According to the first embodiment of the present disclosure, an information processing method is provided. As shown in FIG. 1, the method includes the following steps of:

S10: obtaining an audio signal in an output signal;

S20: determining N channel signals in the audio signal, where N is a positive integer;

S30: determining whether the audio signal needs to be adjusted or not; and

S40: adjusting, when the audio signal needs to be adjusted, an output parameter of at least one of the N channel signals respectively, and outputting the N adjusted channel signals via an audio output device, such that the N adjusted channel signals correspond to a sound source position of the audio signal.

In an implementation, the above information processing method can be applied in an electronic device, including, among others, a computer, a tablet computer, a wearable device or a television. The electronic device can be connected to an audio output device and output audio signals via the audio output device. The output device can be e.g., a headset, a speaker or a home cinema system and the present disclosure is not limited to any specific output device.

First, the method starts with the step S10 where an audio signal in an output signal is obtained.

In an embodiment of the present disclosure, the electronic device can output multimedia signals, such as video signals and audio signals. When the electronic device is outputting a multimedia signal, an audio signal in the multimedia signal can be obtained. For example, when the current output signal is a video signal, an audio signal can be extracted from the video signal. In particular, the audio signal can be extracted using audio extraction software or the processor of the electronic device. The present disclosure is not limited to any specific approach for obtaining the audio signal.

Next, the method proceeds with the step S20 where N channel signals in the audio signal are determined.

Specifically, the audio signal may include a number of channels. For example, a mono-channel signal includes one channel, a dual-channel signal includes two channels, and a stereo-channel channel may include four or five channels. In the case of a dual-channel signal, the audio signal includes two channels, i.e., a left channel and a right channel, which can play the same or different audio signals. That is, a dual-channel signal includes two audio signals, a left channel signal and a right channel signal. As another example, a five-channel stereo (Dolby stereo) includes five channel signals, i.e., left, center, right, left surround and right surround. In an implementation, once the audio signal in the output signal has been obtained, it is processed by the electronic device to obtain N channel signals in the audio signal. The embodiment of the present disclosure will be explained with reference to an example where N=2, i.e., the audio signal includes two channels, a left channel and a right channel.

Further, the method proceeds with the step S30 where it is determined whether the audio signal needs to be adjusted or not.

In an implementation, it is determined whether the audio signal needs to be adjusted depending on actual situations. For example, when the output signal is a video signal, the audio signal needs no adjustment if the original audio signal is synchronized with the video signal. On the other hand, if the original audio signal is not synchronized with the video signal, the audio signal needs to be adjusted.

Further, the method proceeds with the step S40 where, when the audio signal needs to be adjusted, an output parameter of at least one of the N channel signals is adjusted respectively, and the N adjusted channel signals are output via an audio output device, such that the N adjusted channel signals correspond to a sound source position of the audio signal.

In particular, in the example where the output signal is a video signal, when pictures of the video signal shows a close shot being switched to a long shot while the audio signal is not adjusted, i.e., the audio signal still has an audio output parameter for the close shot, there would be a mismatch between the audio signal and the sound source position, resulting in a loss of synchronism between the audio signal and the pictures of the video signal. Therefore, when the audio signal needs to be adjusted, an output parameter of at least one of the N channel signals is adjusted.

Optionally, in an embodiment of the present disclosure, prior to the step S30, the method further includes a step of determining a device type of the audio output device.

In particular, the device type can be a mobile audio output device or a fixed audio output device. The mobile audio output device matches a head gesture of a user of the electronic device. For example, the mobile audio output device includes a headset or a head-wearing audio output device and can move as the user's head moves, i.e., the mobile audio output device can move synchronously with the user's head. The fixed audio output device includes a computer speaker or a home cinema device and is typically placed at a certain position and will not be moved frequently.

Accordingly, in an implementation, the step S30 includes determining whether the audio signal needs to be adjusted based on the device type.

In particular, the mobile audio output device and the fixed audio output device have different audio signal output mechanisms depending on specific use cases, including, but not limited to, the following implementations.

Implementation I

It is determined that the audio signal needs to be adjusted when the output signal is a panoramic video signal and the device type is the mobile audio output device. The panoramic video signal is output from a head-wearing device and capable of switching a video content based on a change in the head gesture of the user. Accordingly, the step of adjusting the output parameter of at least one of the N channel signals respectively includes adjusting the output parameter of the at least one channel signal respectively in response to switching of the video content.

In particular, when the user is using a head-wearing device, e.g., a virtual reality device Oculus, Oculus can output a panoramic video signal and present to the user a virtual scene that makes the user feel like he/she is in the virtual scene in person. The virtual scene will change as the user's head moves, so as to make the user feel like it is real. For example, the current virtual scene could be a concert scene and the user can be an audience in the concert and can view the entire concert scene by moving his/her head.

When the user is using a mobile audio output device, such as a headset, as the output device of the audio signal, he/she can hear the sounds of the entire concert with the audio signal output from the headset, including sound of singing, sound of audiences and other sounds. In the above example where the audio signal includes two channel signals, a left channel and a right channel, when the user turns his/her head to the left (assuming that in this case the his/her left ear gets farther from the stage of the concert and his/her right ear gets closer to the stage of the concert), the component of the audiences' cheer as heard by the left ear will increase and the component of the sound of singing from the stage as heard by the right ear will increase. That is, with the method according to the embodiment of the present disclosure, the output parameter of the at least one channel signal can be adjusted respectively in response to switching of the video content. Of course, when the audio signal includes more channels, the signals of these channels can be adjusted in response to the movement of the user's head.

Further, when the output signal is a panoramic video signal and the output device is a fixed audio output device, the audio signal may not be adjusted, since the movement of the user' head inherently causes a change in the positional relation between the user's head and an external speaker and thus the sound heard by the user has changed in response to the positional change. In the above example of concert, the external speaker has created a field sound environment of the concert and, if the user changes his/her position, he/she will hear different sounds. There is no need for processing the audio signal.

Implementation II

It is determined that the audio signal needs to be adjusted when the output signal is a normal video signal and the device type is the fixed audio output device.

Accordingly, the step of adjusting the output parameter of at least one of the N channel signals respectively includes adjusting the output parameter of the at least one channel signal respectively in response to switching of a video content of the normal video signal.

In particular, when the output signal is a normal video signal, it does not change as the user's head moves. If the audio output device is a fixed audio output device, e.g., an external speaker, the audio signal needs to be adjusted in response to the movement of the user's head. In an implementation, e.g., in the above example of concert, when the user is placed in front of the stage listening to the singer singing in the virtual scene, the virtual scene does not change if the user moves his/her head. That is, the user always sees the singer on the stage, regardless of whether he/she move his/her head or not. Without any change in the scene, the sound corresponding to the scene as heard by the user shall not be changed. However, in the case where the output device is an external speaker, when the user's head moves, the sound he/she hears will change if the audio signal is not adjusted, resulting in a loss of synchronism between the sound and the picture. Hence, the audio signal needs to be adjusted, such that the sound heard by the user will not be changed, i.e., the synchronism between the sound and the picture can be maintained.

Further, when the output signal is a normal video signal and the audio output device is a mobile audio output device, such as a headset, the output parameter of the audio signal may not be adjusted. In particular, when the user wears a headset and views a virtual concert, the output signal is a normal video signal that does not change as the user's head moves and the output parameter of the audio signal needs to be maintained as the user's head moves. This can be done by simply refraining adjustment of the audio signal output from the headset.

Implementation III

The output signal is the audio signal and the step of determining whether the audio signal needs to be adjusted includes detecting the head gesture of the user of the electronic device, the audio signal being adjustable based on the head gesture; and determining that the audio signal needs to be adjusted when a change in the head gesture is detected and the device type is the mobile audio output device.

Accordingly, the step of adjusting the output parameter of at least one of the N channel signals respectively includes: adjusting the output parameter of the at least one channel signal respectively based on the head gesture.

In particular, in the case where the output signal is the audio signal and the audio output device is a mobile audio output device, if the audio signal needs to be changed in response to the movement of the user's head, the output parameter of the audio signal is adjusted in response to a change in the head gesture of the user. If the audio output device is a fixed audio output device, such as an external speaker, the output parameter of the audio signal may not be changed and the sound will change due to the change in the positional relation between the head and the external speaker.

Further, in an implementation, the step S40 includes the following steps of: determining M sound source signals constituting an i-th channel signal, where i is an integer ranging from 1 to N; adjusting the output parameter of each of the M sound source signals respectively based on a video content of the video signal or a detected head gesture of a user of the electronic device, so as to obtain M adjusted sound source signals; and mixing the M adjusted sound source signals into an i-th adjusted channel signal.

In particular, in the example where the audio signal includes two channels, a left channel signal and a right channel signal, first a sound source signal included in the left channel signal and a sound source signal included in the right channel signal are determined. For example, the left and right channel signals include a first sound source signal generated by a singer and a second sound source signal generated by audiences, i.e., M=2. If it is detected that the user' head turns 90 degrees to the left and his/her left ear is farther from the first sound source generated by the singer and closer to the second sound source generated by the audiences, then, based on the movement of the user's head, the weight of the first sound source is reduced accordingly and the weight of the second sound source is increased in the left channel signal. That is, the weights of the respective sound sources are reassigned. Then, the individual sound sources are mixed into an adjusted left channel signal. Here the output parameter can be an amplitude, duration, frequency or weight of the sound source signal and can be adjusted as desired by those skilled in the art. The present disclosure is not limited to any specific output parameter.

Second Embodiment

Figure 2:
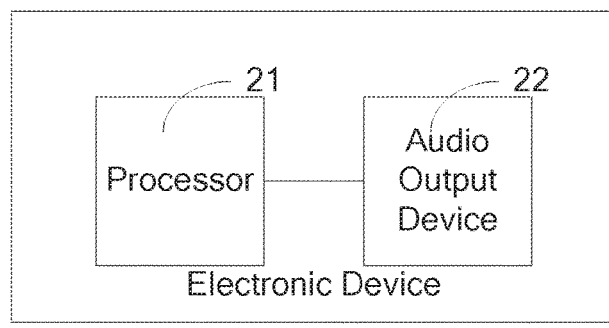
FIG. 2 is a block diagram of an electronic device according to a second embodiment of the present disclosure.

Based on the same inventive concept as the above first embodiment of the present disclosure, referring to FIG. 2, an electronic device is provided according to a second embodiment of the present disclosure. The electronic device includes a processor 21 and an audio output device 22 connected to the processor 21.

Here, the processor 21 is configured to obtain an audio signal in an output signal; determine N channel signals in the audio signal, where N is a positive integer; determine whether the audio signal needs to be adjusted or not; and adjust, when the audio signal needs to be adjusted, an output parameter of at least one of the N channel signals respectively. The audio output device 22 is configured to output the N adjusted channel signals, such that the N adjusted channel signals correspond to a sound source position of the audio signal.

In an implementation, the electronic device further includes a memory, a communication unit and an Input/Output (I/O) interface. The processor can be e.g., a general-purpose Central Processing Unit (CPU), which can be an Application Specific Integrated Circuit (ASIC) or one or more integrated circuits for controlling execution of programs. There could be one or more memories. The memory can include a Read Only Memory (ROM), a Random Access Memory (RAM) or a disk memory. The memory and the communication unit can be connected to the processor via a bus. The communication device includes a receiver and a transmitter, which can be two elements physically independent from each other or one single physical element. The I/O interface can be connected to an external device. The memory can store instructions executable by the processor.

The processor 21 is further configured to: determine a device type of the audio output device as a mobile audio output device or a fixed audio output device, the mobile audio output device matching a head gesture of a user of the electronic device; and determine whether the audio signal needs to be adjusted based on the device type.

The processor 21 is further configured to: determine that the audio signal needs to be adjusted when the output signal is a panoramic video signal and the device type is the mobile audio output device, the panoramic video signal being output from a head-wearing device and capable of switching a video content based on a change in the head gesture of the user, and adjust the output parameter of the at least one channel signal respectively in response to switching of the video content.

The processor 21 is further configured to: determine that the audio signal needs to be adjusted when the output signal is a normal video signal and the device type is the fixed audio output device, and adjust the output parameter of the at least one channel signal respectively in response to switching of a video content of the normal video signal.

The electronic device further includes: a detection unit configured to detect the head gesture of the user of the electronic device, the audio signal being adjustable based on the head gesture. The processor is further configured to: determine that the audio signal needs to be adjusted when a change in the head gesture is detected and the device type is the mobile audio output device, and adjust the output parameter of the at least one channel signal respectively based on the head gesture.

The processor 21 is further configured to: determine M sound source signals constituting an i-th channel signal, where i is an integer ranging from 1 to N; adjust the output parameter of each of the M sound source signals respectively based on a video content of the video signal or a detected head gesture of a user of the electronic device, so as to obtain M adjusted sound source signals; and mix the M adjusted sound source signals into an i-th adjusted channel signal.

Various alternatives and specific examples as described above in connection with the information processing method according to the embodiment shown in FIG. 1 also apply to the electronic device of this embodiment. The implementation of the electronic device of this embodiment will be apparent to those skilled in the art by referring to the detailed description of the above information processing method and thus will be omitted for simplicity in the description.

Third Embodiment

Figure 3:
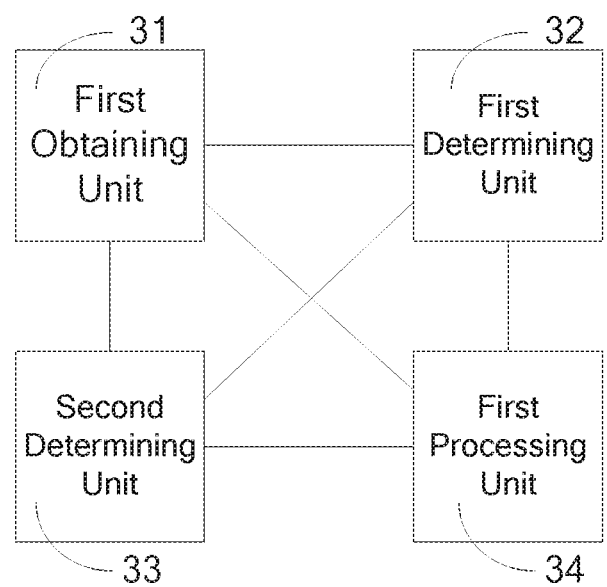
FIG. 3 is a block diagram of an electronic device according to a third embodiment of the present disclosure.

Based on the same inventive concept as the above first embodiment of the present disclosure, referring to FIG. 3, an electronic device is provided according to a third embodiment of the present disclosure. The electronic device includes: a first obtaining unit 31 configured to obtain an audio signal in an output signal; a first determining unit 32 configured to determine N channel signals in the audio signal, where N is a positive integer; a second determining unit 33 configured to determine whether the audio signal needs to be adjusted or not; and a first processing unit 34 configured to adjust, when the audio signal needs to be adjusted, an output parameter of at least one of the N channel signals respectively, and output the N adjusted channel signals via an audio output device, such that the N adjusted channel signals correspond to a sound source position of the audio signal.

The electronic device further includes a third determining unit configured to determine a device type of the audio output device as a mobile audio output device or a fixed audio output device, the mobile audio output device matching a head gesture of a user of the electronic device. Accordingly, the second determining unit 33 includes a first determining subunit configured to determine whether the audio signal needs to be adjusted based on the device type.

The second determining unit 33 includes a second determining subunit configured to determine that the audio signal needs to be adjusted when the output signal is a panoramic video signal and the device type is the mobile audio output device, the panoramic video signal being output from a head-wearing device and capable of switching a video content based on a change in the head gesture of the user. Accordingly, the first processing unit 34 includes a first processing subunit configured to adjust the output parameter of the at least one channel signal respectively in response to switching of the video content.

The second determining unit 33 includes a third determining subunit configured to determine that the audio signal needs to be adjusted when the output signal is a normal video signal and the device type is the fixed audio output device. Accordingly, the first processing unit 34 includes a second processing subunit configured to adjust the output parameter of the at least one channel signal respectively in response to switching of a video content of the normal video signal.

Further, the output signal is the audio signal and the second determining unit 33 includes a first detecting subunit configured to detect the head gesture of the user of the electronic device, the audio signal being adjustable based on the head gesture; a fourth determining subunit configured to determine that the audio signal needs to be adjusted when a change in the head gesture is detected and the device type is the mobile audio output device. Accordingly, the first processing unit 34 includes a third processing subunit configured to adjust the output parameter of the at least one channel signal respectively based on the head gesture.

Further, the first processing unit 34 includes a fifth determining subunit configured to determine M sound source signals constituting an i-th channel signal, where i is an integer ranging from 1 to N; a fourth processing subunit configured to adjust the output parameter of each of the M sound source signals respectively based on a video content of the video signal or a detected head gesture of a user of the electronic device, so as to obtain M adjusted sound source signals; and a first reconstructing subunit configured to mix the M adjusted sound source signals into an i-th adjusted channel signal.

Various alternatives and specific examples as described above in connection with the information processing method according to the embodiment shown in FIG. 1 also apply to the electronic device of this embodiment. The implementation of the electronic device of this embodiment will be apparent to those skilled in the art by referring to the detailed description of the above information processing method and thus will be omitted for simplicity in the description.

One or more solutions according the above embodiments of the present disclosure have at least the following one or more technical effects.

First, with the solutions according to the embodiments of the present disclosure, once an audio signal in an output signal has been obtained, the audio signal is processed to determine N channel signals in the audio signal. When the audio signal needs to be adjusted, an output parameter of at least one of the N channel signals is adjusted respectively, such that the N adjusted channel signals correspond to a sound source position of the audio signal. For example, when a position of the user changes with respect to the sound source position, the audio signal can be adjusted automatically according to the above method. In contrast, in the conventional solution, the parameter of the audio signal is predetermined and fixed, regardless of whether there is a positional change. In this way, the solutions according to the embodiments of the present disclosure can solve the technical problem that the audio signal cannot be adjusted in real time and achieve a technical effect of automatic adjustment of the audio signal.

Second, with the solutions according to the embodiments of the present disclosure, it is determined whether the audio signal needs to be adjusted based on the output signal and the device type of the audio output device. That is, different audio output schemes can be selected depending on the output signal and the device type. For example, when a mobile audio output device outputs a panoramic video signal, the output parameter can be adjusted based on a change in a head gesture. In this way, the solutions according to the embodiments of the present disclosure can utilize the optimal audio signal adjustment scheme and output the audio signal, such that the user experience can be improved.

Third, with the solutions according to the embodiments of the present disclosure, a sound source signal in each channel signal is determined and the output parameter of each sound source signal is adjusted based on the head gesture of the user. In this way, in the solutions according to the embodiments of the present disclosure, the audio output device can output the adjusted audio signal that better meets the user's requirements.

The present disclosure have been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In particular, the computer program instructions for implementing the information processing method according to the embodiment of the present disclosure can be stored on a storage medium such as an optical disc, a hard disk or a flash memory. The computer program instructions stored in the storage medium for implementing the information processing method include, when read or executed by an electronic device, the following steps of: obtaining an audio signal in an output signal; determining N channel signals in the audio signal, where N is a positive integer; determining whether the audio signal needs to be adjusted or not; and adjusting, when the audio signal needs to be adjusted, an output parameter of at least one of the N channel signals respectively, and outputting the N adjusted channel signals via an audio output device, such that the N adjusted channel signals correspond to a sound source position of the audio signal.

Optionally, the computer program instructions stored in the storage medium further include computer program instructions, when executed prior to said determining whether the audio signal needs to be adjusted or not, for: determining a device type of the audio output device as a mobile audio output device or a fixed audio output device, the mobile audio output device matching a head gesture of a user of the electronic device. Accordingly, the computer program instructions stored in the storage medium for determining whether the audio signal needs to be adjusted include computer program instructions, when executed, for: determining whether the audio signal needs to be adjusted based on the device type.

Optionally, the computer program instructions stored in the storage medium for determining whether the audio signal needs to be adjusted include computer program instructions, when executed, for: determining that the audio signal needs to be adjusted when the output signal is a panoramic video signal and the device type is the mobile audio output device, the panoramic video signal being output from a head-wearing device and capable of switching a video content based on a change in the head gesture of the user. Accordingly, the computer program instructions stored in the storage medium for adjusting the output parameter of at least one of the N channel signals respectively include computer program instructions, when executed, for: adjusting the output parameter of the at least one channel signal respectively in response to switching of the video content.

Optionally, the computer program instructions stored in the storage medium for determining whether the audio signal needs to be adjusted include computer program instructions, when executed, for: determining that the audio signal needs to be adjusted when the output signal is a normal video signal and the device type is the fixed audio output device. Accordingly, the computer program instructions stored in the storage medium for adjusting the output parameter of at least one of the N channel signals respectively include computer program instructions, when executed, for: adjusting the output parameter of the at least one channel signal respectively in response to switching of a video content of the normal video signal.

Optionally, the computer program instructions stored in the storage medium for determining whether the audio signal needs to be adjusted include computer program instructions, when executed, for: detecting the head gesture of the user of the electronic device, the audio signal being adjustable based on the head gesture; and determining that the audio signal needs to be adjusted when a change in the head gesture is detected and the device type is the mobile audio output device. Accordingly, the computer program instructions stored in the storage medium for adjusting the output parameter of at least one of the N channel signals respectively include computer program instructions, when executed, for: adjusting the output parameter of the at least one channel signal respectively based on the head gesture.

Optionally, the computer program instructions stored in the storage medium for adjusting the output parameter of at least one of the N channel signals respectively include computer program instructions, when executed, for: determining M sound source signals constituting an i-th channel signal, where i is an integer ranging from 1 to N; adjusting the output parameter of each of the M sound source signals respectively based on a video content of the video signal or a detected head gesture of a user of the electronic device, so as to obtain M adjusted sound source signals; and mixing the M adjusted sound source signals into an i-th adjusted channel signal.

While the preferred embodiments of the present disclosure have been described above, various modifications and alternatives to these embodiments can be made by those skilled in the art based on the fundamental inventive concept. Therefore, these preferred embodiments and all the modifications and alternatives falling within the scope of the present disclosure are to be encompassed by the claims as attached.

Obviously, various modifications and alternatives can be made to the present disclosure by those skilled in the art without departing from the spirit and scope of the present disclosure. Therefore, these modifications and alternatives are to be encompassed by the present disclosure if they fall within the scope of the claims and their equivalents.

What is claimed is:
1. An information processing method, comprising:
obtaining an audio signal in an output signal;
determining N channel signals in the audio signal, where N is a positive integer;
determining whether the audio signal needs to be adjusted; and
adjusting, if the audio signal needs to be adjusted, an output parameter of at least one of the N channel signals respectively, and outputting the N adjusted channel signals via an audio output device, such that the N adjusted channel signals correspond to a sound source position of the audio signal;
wherein said adjusting the output parameter of at least one of the N channel signals respectively comprises:

determining M sound source signals constituting an i-th channel signal, where i is an integer ranging from 1 to N;
adjusting an output parameter of each of the M sound source signals based on a video content of a video signal or a detected head gesture of a user of an electronic device, so as to obtain M adjusted sound source signals; and
mixing the M adjusted sound source signals into an i-th adjusted channel signal.

2. The method of claim 1, further comprising, prior to said determining whether the audio signal needs to be adjusted:
determining a device type of the audio output device, wherein the device type corresponds to a mobile audio output device or a fixed audio output device, the mobile audio output device matching a head gesture of a user of the electronic device,
wherein said determining whether the audio signal needs to be adjusted comprises:
determining whether the audio signal needs to be adjusted based on the device type.

3. The method of claim 2, wherein said determining whether the audio signal needs to be adjusted comprises:
determining that the audio signal needs to be adjusted if the output signal is a panoramic video signal and the device type is the mobile audio output device, the panoramic video signal being output from a head-wearing device and capable of switching a video content based on a change in the head gesture of the user, and
wherein said adjusting the output parameter of at least one of the N channel signals respectively comprises:
adjusting the output parameter of the at least one channel signal respectively in response to switching the video content.

4. The method of claim 2, wherein said determining whether the audio signal needs to be adjusted comprises:
determining that the audio signal needs to be adjusted if the output signal is a normal video signal and the device type is the fixed audio output device, and
wherein said adjusting the output parameter of at least one of the N channel signals respectively comprises:
adjusting the output parameter of the at least one channel signal respectively in response to switching a video content of the normal video signal.

5. The method of claim 2, wherein said determining whether the audio signal needs to be adjusted comprises:
detecting the head gesture of the user of the electronic device, the audio signal being adjustable based on the head gesture; and
determining that the audio signal needs to be adjusted, if a change in the head gesture is detected and the device type is the mobile audio output device, and
wherein said adjusting the output parameter of at least one of the N channel signals respectively comprises:
adjusting the output parameter of the at least one channel signal respectively based on the head gesture.

6. An electronic device, comprising:
a processor; and
an audio output device coupled to the processor,
wherein the processor is configured to:
obtain an audio signal in an output signal;
determine N channel signals in the audio signal, where N is a positive integer;
determine whether the audio signal needs to be adjusted; and
adjust, if the audio signal needs to be adjusted, an output parameter of at least one of the N channel signals respectively, and
wherein the audio output device is configured to:
output the N adjusted channel signals, such that the N adjusted channel signals correspond to a sound source position of the audio signal; and
wherein the processor is further configured to:
determine M sound source signals constituting an i-th channel signal, where i is an integer ranging from 1 to N;
adjust an output parameter of each of the M sound source signals based on a video content of a video signal or a detected head gesture of a user of an electronic device, so as to obtain M adjusted sound source signals; and
mix the M adjusted sound source signals into an i-th adjusted channel signal.

7. The electronic device of claim 6, wherein the processor is further configured to:
determine a device type of the audio output device, wherein the device type corresponds to a mobile audio output device or a fixed audio output device, the mobile audio output device matching a head gesture of a user of the electronic device; and
determine whether the audio signal needs to be adjusted based on the device type.

8. The electronic device of claim 7, wherein the processor is further configured to:
determine that the audio signal needs to be adjusted if the output signal is a panoramic video signal and the device type is the mobile audio output device, the panoramic video signal being output from a head-wearing device and capable of switching a video content based on a change in the head gesture of the user, and
adjust the output parameter of the at least one channel signal respectively in response to switching the video content.

9. The electronic device of claim 7, wherein the processor is further configured to:
determine that the audio signal needs to be adjusted if the output signal is a normal video signal and the device type is the fixed audio output device, and
adjust the output parameter of the at least one channel signal respectively in response to switching a video content of the normal video signal.

10. The electronic device of claim 7, further comprising:
a detection unit configured to detect the head gesture of the user of the electronic device, the audio signal being adjustable based on the head gesture, and
wherein the processor is further configured to:
determine that the audio signal needs to be adjusted if a change in the head gesture is detected and the device type is the mobile audio output device, and
adjust the output parameter of the at least one channel signal respectively based on the head gesture.

11. An electronic device, comprising:
a first obtaining unit configured to obtain an audio signal in an output signal;
a first determining unit configured to determine N channel signals in the audio signal, where N is a positive integer;
a second determining unit configured to determine whether the audio signal needs to be adjusted; and
a first processing unit configured to adjust, if the audio signal needs to be adjusted, an output parameter of at least one of the N channel signals respectively, and output the N adjusted channel signals via an audio output device, such that the N adjusted channel signals correspond to a sound source position of the audio signal;

wherein the first processing unit is further configured to: determine M sound source signals constituting an i-th channel signal, where i is an integer ranging from 1 to N; adjust an output parameter of each of the M sound source signals based on a video content of a video signal or a detected head gesture of a user of an electronic device, so as to obtain M adjusted sound source signals; and mix the M adjusted sound source signals into an i-th adjusted channel signal.

* * * * *